July 25, 1944.    W. H. WHEELER    2,354,627
VEHICLE
Filed April 25, 1941    2 Sheets-Sheet 1
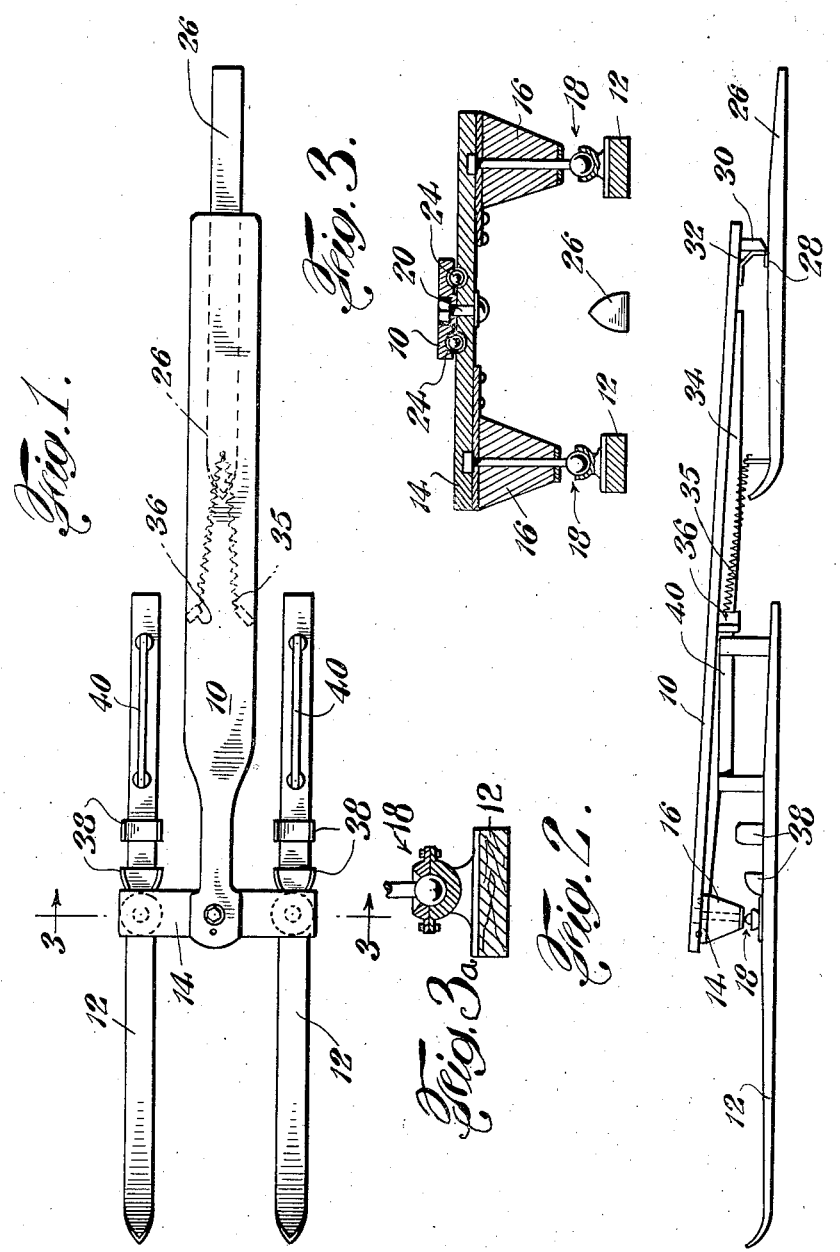
INVENTOR
William H. Wheeler
BY Brown + Jones
ATTORNEYS

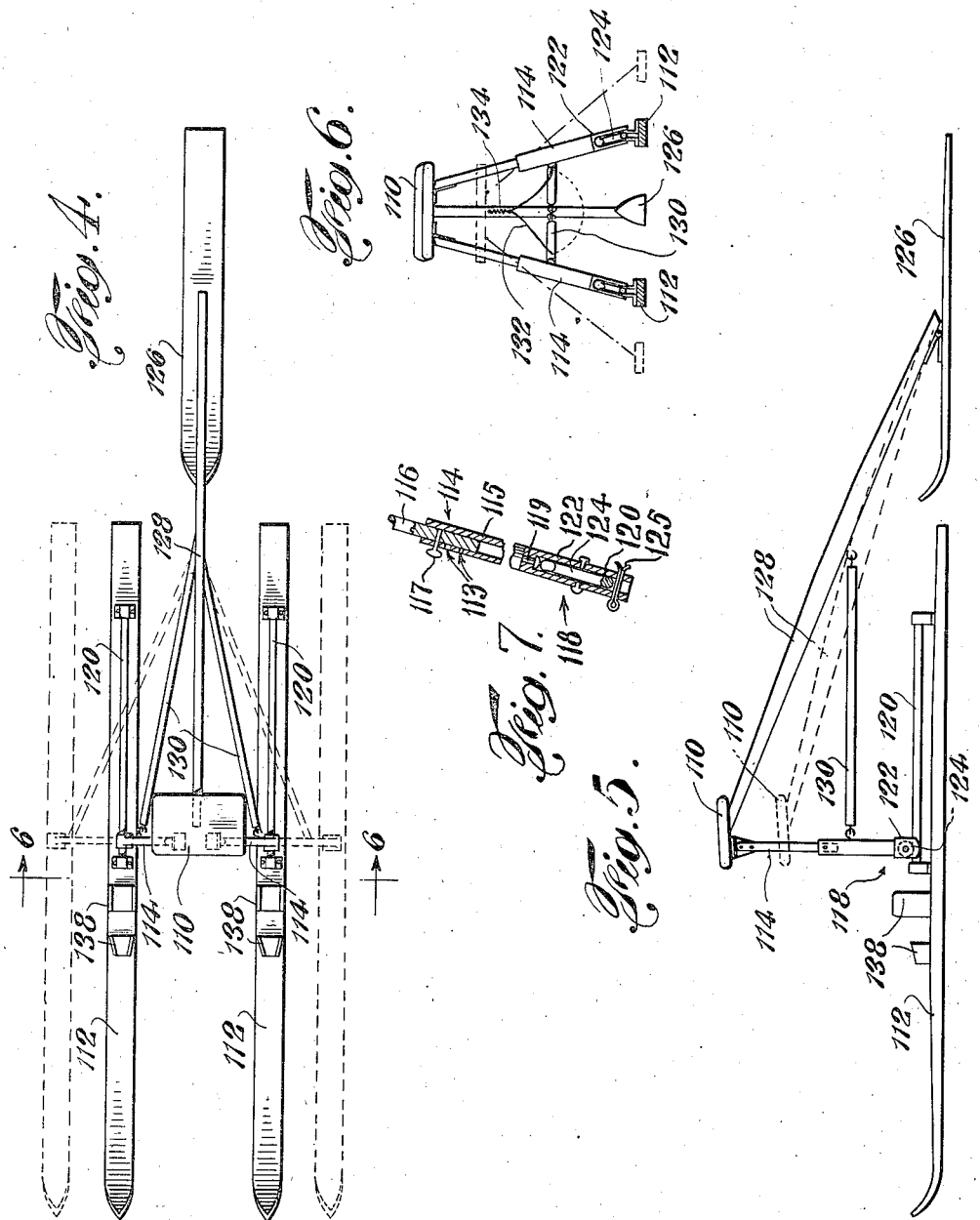

Patented July 25, 1944

2,354,627

UNITED STATES PATENT OFFICE 2,354,627

VEHICLE

William H. Wheeler, New York, N. Y.

Application April 25, 1941, Serial No. 390,218

11 Claims. (Cl. 280—16)

This invention relates to a vehicle and more specifically to a vehicle adapted to be used for sport.

In general, it is an object of the invention to provide a device of the character described, which will efficiently perform the purpose for which it is intended, which is simple and economical of construction, which can be expeditiously, conveniently and safely manipulated, and which can be readily manufactured and assembled.

Another object of the invention is to provide a vehicle on runners for conveying loads comprising persons and/or objects over substances like ice or snow; to provide such a vehicle the control of which is similar to that of a pair of skis but the control of which is under a seated operator and the control of which may be pedal or manual or both; to provide such a vehicle with two front runners and a single or double rear runner; to provide front runners which are jointly and/or independently operable and which may or may not be demountable; to provide such a vehicle with a seat which may be positioned at various heights; to provide such a vehicle the front runners of which may be moved, independently of the remainder of the vehicle and independently of each other, forwardly and backwardly, sidewardly, and/or about vertical axes, and/or about their longitudinal axes.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a plan view of vehicle embodying one form of the invention;

Fig. 2 is a side view in elevation of the vehicle shown in Fig. 1;

Fig. 3 is a view in cross-section of the vehicle shown in Figs. 1 and 2 and taken along the line 3—3 of Fig. 1, Fig. 3a in an enlarged detailed sectional view with parts broken away, of a preferred form of ball and socket joint for connection of a front runner to superstructure, Figs. 4, 5 and 6 are views, similar to Figs. 1, 2 and 3 respectively, of a modification of vehicle shown in Figs. 1, 2 and 3, and Fig. 7 is an enlarged detailed view with parts omitted and parts broken away of the connection of a seat supporting member or leg to a front runner of the vehicle structure shown in Figs. 4, 5 and 6.

It is desirable that there be a vehicle for sport purposes which may be used under conditions which permit skiing, which is operated more or less like a pair of skis, but the operator of which may be seated. Such a vehicle is well suited for use by the very young or by those who, for one reason or another do not ski. At the present time the highways are kept in a condition not feasible for vehicles with runners. On the other hand, there are large areas, e. g., hillsides and the like, covered with soft snow which have been made available to the public and on which not only skis but also vehicles like those described below may be used by persons who do not ski. The control of these vehicles may be by the feet and/or the hands and may be of the same nature as control which may be exerted by a skier, since they comprise a pair of front runners which are essentially skis.

In the drawings 10 denotes the body or seat of the vehicle. The seat is a long element with a flat or suitably molded upper surface. It is connected to and supported by runners. There are two generally parallel front runners 12 which are substantially ski-shaped. A cross piece 14 extends horizontally from a point above one runner 12 to a point above the other. Suitable means are provided for detachably mounting the runners beneath the cross piece 14. In the form shown in the drawings supports 16 are fixedly attached to the underside of the ends of the cross piece. There is a universal joint 18 between each support 16 and the respective runner 12. This may be a ball and socket joint. The parts of the joint may be separable, e. g., the upper casing of the joint may be screwedly connected to the lower casing as shown in Fig. 3a.

The body member 10 may be rigid or movable with respect to the cross piece 14. The front end of the former may ride on the latter, being rotatable about a bolt 20 which extends through elements 10 and 14, although any suitable connection may be used. There may be antifriction means 24 between the body and the cross piece.

The rear end of the body 10 is carried on a rear runner 26 which, like the others, is generally ski-shaped. It has been found advantageous to have runner 26 rotatable about a horizontal axis. To obtain this result the runner 26 may have a hinge 28 attached to the upper surface of that runner. The hinge has a horizontal axis cross-wise of the rear runner. The hinge may also be attached to a supporting block 30. Bracing means 32 may be provided for the block and hinge. Bracing means 34 may be provided beneath the body 10 to strengthen the latter. The front end of the rear runner may be prevented from being bent horizontally about the supporting block 30 by connecting means between the front of the runner and the body 10. As shown, these means are in the form of springs 35 attached to blocks 36 on body 10.

Each front ski may be operated alone. There are foot holds 38 on each front ski. There are also hand grips 40. The holds and the grips are positioned so that they may be used simultaneously by a person seated on the body 10. The joints 18 may operate with sufficient friction that with the runners 12 in a given position, say parallel, when one runner is moved so as to rotate the cross piece with respect to the body, the other runner 12 remains parallel to the first runner. So operating the front runners act as a unit.

The vehicle described in the foregoing may be used on open snow-covered fields as well as on many other types of surfaces. Its two front runners may be maneuvered like a pair of skis. Their front ends may be pointed in toward each other in a braking action. The universal joints permit either or both front runners to be rotated about their respective longitudinal axes, or either or both may be turned to a position not perpendicular to the support 16.

The modification shown in Figs. 4, 5 and 6 permits the operator of the vehicle a wider control over the front runners as well as a choice of heights for the seat. A tyro prefers a low seat which gives a low center of gravity for the combination of the vehicle and driver. Those more expert like a higher seat. The structure described below may have its seat movable to a position such that the operator, when seated, is in the crouching position used in skiing. In this modification there is complete freedom of control of the front runners. Not only may they be turned independently about horizontal axes and about vertical axes, but they may take all positions at various distances apart. Furthermore these front runners may be operated by the feet of the driver of the vehicle, so that each runner moves forward independently of the other runner and thereby the vehicle can be propelled in any direction, e. g., up a slope.

In Figs. 4, 5 and 6, 110 denotes a seat connectedly supported from two front runners 112 and a rear runner 126. Means for the seat include two adjustably extensible elements 114 which may be hingedly attached to the under side of the seat and also by a kind of universal joint 118 to the respective front skis. The extensible element or leg 114 as shown in Fig. 7 may comprise a socketed member 115 and a shaft 116 with the socketed member 115 being provided with a plurality of holes 113, any one of which is adapted to be aligned with a hole in the shaft 116 for reception of a locating pin 117 to hold the two parts together in the desired adjusted position. Thus by suitable selection of a hole 113 for alignment with the hole in the shaft 116 and reception of the retaining pin 117 the desired length of element 114 may be obtained.

The following arrangement of parts has been found to give satisfactory independent maneuverability to the front runners. A horizontal bar 120, of circular cross-section, is supported from, above and along each ski 112. Attached to the lower end of each element 114, or the socketed member 115 thereof, as by a swivel 119 as shown in Fig. 7, is a frame element 122 having a chamber therein open at the end of said element. The grooved rim of pulley 124, carried in chamber, seats on and fits bar 120. A locking member, such as a cotter pin 125, extends through element 122 and under the bar or rail 120, and at a suitable distance therebeneath to permit freedom of action, and prevents separation of the frame 122 from the bar or rail 120 and the ski or runner 112 on which it is mounted.

A supporting element 128 for the seat extends from the latter to the rear runner 126 and may be hingedly attached to the latter. Connections 130 may extend between points on supporting elements 114 and 128. Connecting means 132, which may take the form of a chain, extend between elements 114 or 130 and prevent the front runners from being spread apart by more than a desired amount. Chain 132 may be caught up at its middle and supported by a spring 134 attached to the underside of element 128. When this modification is employed, under many conditions of use the weight of the superstructure, and the rider when sitting on the seat 110, will cause the front skis or runners 112 to spread to the dotted line position shown in Fig. 6, such spreading being limited by the connecting means or chain 132. Of course, should the rider stand up he readily can cause the front skis or runners 112 to be brought more closely together such as to the full line positions of Fig. 6, by manipulations similar to those employed in normal skiing.

Means 138 on the front runners position the feet of the operator.

It is obvious that the vehicle may be controlled in descent in substantially the same manner in which a pair of skis is maneuvered. Gliding drag or friction between the under surfaces of front skis or runners 112 and the snow or substance over which the vehicle slides during descent will normally tend to cause the grooved wheels or pulleys 124, rotatably mounted in the leg members 122, to be positioned at the forward ends of the rails or bars 120 as shown in Fig. 5. This occurs due to the fact that the rider actually sits down upon the seat 110 and in doing so supports the major portion of his weight upon the seat. He will thus normally exert relatively much less pressure against the skis with his feet since at the points of fastenings for the feet the skis are subjected to force due to relatively little weight, that of the rider's feet and parts of his legs, as compared to the much greater weight of the rider's body and other parts of his legs supported on or by the superstructure of the vehicle and carried by the front skis 112 by means of the wheels 124 and rails 120. Thus in descending a slope with drag on the runners tending to retard their progress and the component of the force due to gravity weight of the body of the rider and vehicle superstructure acting in a forward direction down the slope upon the vehicle superstructure the relative positions of wheels 124 and rails 120 shown in Fig. 5 will naturally be assumed at least for a large part of the time. Only in case drag on one of these two runners and/or the rear runner 126 becomes suddenly or greatly increased to such an extent as to permit force due to kinetic energy on one or both front runners, and possibly force applied in a forward direction by feet of rider augmenting the kinetic force, to overcome the drag and cause one or both front runners, as the case may be, to run forward, will one or both of wheels 124 ride backward on one or both of rails 120 to rear positions. Such operations may, however, occur only infrequently and in any event will usually be had for only short durations of time and upon termination of conditions bringing about such operations the front runners will automatically be restored to their rear positions as depicted in Fig. 5. When it is desired to progress in a direction in which gravity does not move the vehicle, the following moves are made. Preferably, the rider rises to a standing position on the front runners. One foot is pushed forward carrying its runner. Bar 120 slides as far as possible in pulley 124. The remainder of the vehicle, including both front supports 114, remains stationary. When the bar can slide no more in its pulley, that foot is stopped. Then the other foot is similarly progressed, causing a motion of the other runner only but when the bar can slide no more forward with respect to its pulley the said other foot is pushed farther forward. This last moves forward all of the vehicle except the first mentioned runner and thereby the first mentioned pulley 120 is moved to the forward end of its bar. Thereafter, alternately, each foot is moved forward in the manner just described for the said other foot.

In either modification, the rear ski may be shorter or wider than the front skis, or the rear support may be, by two or more elements, suitably designed to provide support for the rear end of the element 10, and slidable on snow or ice or other slippery surface.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What I claim as new and desire to secure by Letters Patent is:

1. A vehicle for human beings, said vehicle comprising two independently operable front runners, means connecting said front runners together, and only a single rear runner connected to said means, said front runners being connected together through joint means permitting them to be independently rotatable in substantially horizontal planes about substantially vertical axes and in substantially vertical planes about substantially horizontal axes.

2. A vehicle for human beings, said vehicle comprising two independently operable, connected, front runners, a rear runner and means associated with each of said front runners for receiving a respective foot of a human being, each of said runners being independently rotatable in a horizontal plane about a vertical axis positioned in the region of the respective foot-receiving means and means attached to said runners and connecting said runners.

3. A vehicle for human beings, said vehicle comprising two independently operable, front runners, and one rear runner, means connecting said front runners, means associated with each of said front runners for receiving a respective foot of a human being, and means behind the first-mentioned means and associated with each of said runners for receiving a respective hand of a human being, the portion of the last-mentioned means which is adapted for receiving the grip of the hand being entirely to the rear of both the foot-receiving means and said connecting means and at a height not above the height of the human knee.

4. A vehicle for human beings, said vehicle comprising two independently rotatable in a horizontal plane, connected, front runners and only a single rear runner, and a seat supported from said runners, said runners being demountable.

5. A vehicle for human beings, said vehicle comprising two independently operable, connected, front runners and only a single rear runner, and a seat supported from said runners, said front runners each being independently rotatable about a vertical axis.

6. A vehicle for human beings, said vehicle comprising two, connected, front skis independently rotatable about a vertical axis and only a single rear ski, a foot hold and a hand grip on each of said front skis, connecting and demountable means for holding said front skis apart, a seat having one end rotatable with respect to and supported by said connecting means and having the other end supported by said rear ski.

7. A vehicle for human beings, said vehicle comprising two independently operable, connected, front runners, said runners being movable in a forward and rearward direction with respect to the remainder of said vehicle and means for assisting in such motion and comprising a respective longitudinal guide element fastened to each of said runners and means connecting said elements and slidable along each of said elements.

8. A vehicle for human beings comprising, in combination, two independently operable front runners, and means connecting said front runners together in a manner permitting them at will to be spread apart and brought closer together at the points of connection and including joint means permitting them to be independently rotatable in substantially horizontal planes about substantially vertical axes and in substantially vertical planes about substantially horizontal axes.

9. A vehicle for human beings comprising, in combination, a superstructure, two independently operable front runners, and means connecting each of said runners at a point to said superstructure for universal action, said superstructure being extendable and collapsible to permit said runners at will to be spread apart and brought closer together at the points of connections and said connecting means permitting longitudinal shifting of each runner at its point of connection independently of the other runner.

10. A vehicle for human beings comprising, in combination, two independently operable front runners, and means connecting said front runners together in a manner permitting them at will to be spread apart and brought closer together at the points of connection and including universal joint means permitting them to have independent universal action.

11. A vehicle for human beings comprising, in combination, a superstructure, two independently operable front runners each connected to said superstructure by universal joint means for independent universal action of each front runner, and a single rear runner connected to said superstructure.

WILLIAM H. WHEELER.